Feb. 7, 1933.  A. A. QUICK  1,896,099
TOOTHED TRANSMISSION GEARING
Filed Aug. 6, 1930  3 Sheets-Sheet 1
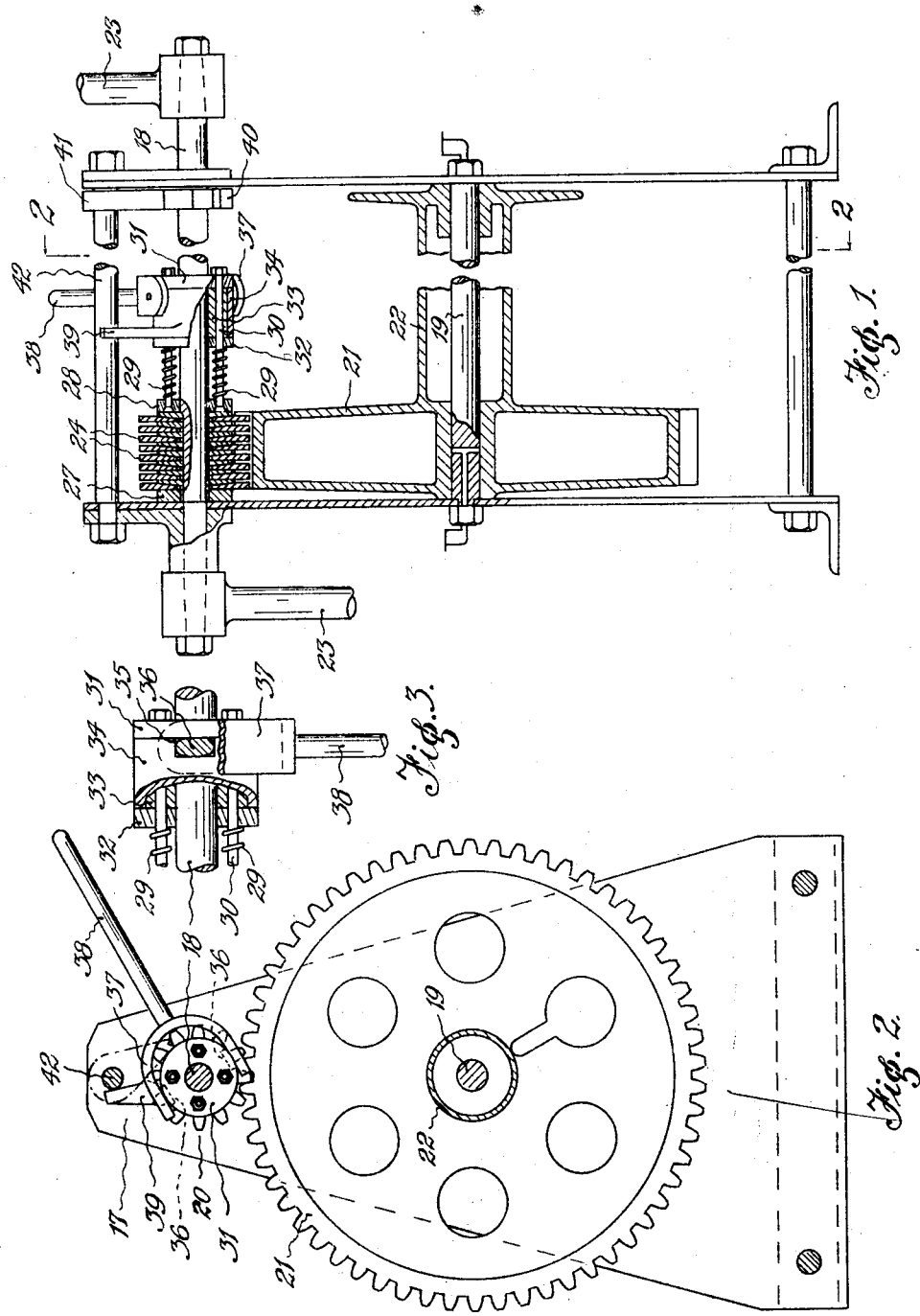
Inventor:
Alfred Arthur Quick
By
Pennie Davis Marvin & Edmonds
attorneys Feb. 7, 1933.       A. A. QUICK       1,896,099
TOOTHED TRANSMISSION GEARING
Filed Aug. 6, 1930      3 Sheets-Sheet 2

Inventor:
Alfred Arthur Quick
By
Pennie Davis Marvin & Edmonds
attorney

Feb. 7, 1933.  A. A. QUICK  1,896,099
TOOTHED TRANSMISSION GEARING
Filed Aug. 6, 1930   3 Sheets-Sheet 3

Inventor:
Alfred Arthur Quick
By Pennie Davis Marvin + Edmonds
attorneys

Patented Feb. 7, 1933

1,896,099

UNITED STATES PATENT OFFICE

ALFRED ARTHUR QUICK, OF THORNBURY, VICTORIA, AUSTRALIA, ASSIGNOR TO THE X-ENGINE COMPANY LIMITED, OF MELBOURNE, VICTORIA, AUSTRALIA

TOOTHED TRANSMISSION GEARING

Application filed August 6, 1930, Serial No. 473,309, and in Australia August 20, 1929.

This invention relates to improvements in and connected with toothed transmission gearing and refers especially to gearing embodying flexible wheels or pinions for the transmission of power.

In this type of gear wheel a series of toothed discs are rotatively mounted on a shaft or rotary member and alternate with a series of friction discs which are mounted slidably but non-rotatively on the shaft or rotary member, means being provided to apply a resilient or yielding end pressure to the assemblage of toothed and friction discs whereby any one or more of the toothed discs will yield under abnormal torque stresses to cause all of the toothed discs to align with and bear evenly on the whole length of the teeth of the gear wheel in mesh therewith. The resilient pressure is regulated so that it will be insufficient to prevent a single toothed disc to yield under excessive pressure but is great enough to enable the combined discs to transmit the power required.

Hitherto the end pressure on the assemblage of toothed and friction discs of flexible or multiple-disc gear wheels has been applied by springs or resilient members acted upon by screw adjustment means or by means of the torque on the shaft produced by the resistance due to the load and it has been proposed to adjust the pressure during the rotation of the flexible gear wheel or of the shaft carrying the same.

The object of the present invention is to provide simple and efficient means which when combined with a flexible gear wheel permits the said wheel to serve as a driving or driven member of a train of gearing and to act as a friction brake to control or arrest the rotation of a gear wheel in mesh therewith.

Another object of the invention is to provide improvements in the construction of the toothed discs and friction discs whereby additional strength will be imparted to the same at those points which are subjected to greatest stresses and larger bearing surfaces are provided between the contacting faces of the elements.

I accomplish the above mentioned object by mounting a flexible gear wheel on a rotatively mounted member having means thereon for varying the end pressure between the toothed and friction discs and in providing a device for locking the rotatively mounted member against rotation due to the application of a load or power applied thereto whereby when the locking device is in use the flexible pinion can be employed as a brake by varying the end pressure exerted on the toothed and friction disc to control the rotation of the gearing in mesh therewith.

The friction discs are formed with one flat side and with the opposite side of conical formation and the contiguous faces of the toothed discs are shaped to correspond thereto. This construction of the elements of the gear wheel ensures a maximum strength at the points where they are subjected to the greatest stresses and also provide greater wearing surfaces and efficiency in operation.

In order that the invention may be readily understood reference will now be had to the accompanying sheets of explanatory drawings wherein Figure 1 is a view in part sectional elevation of a winch embodying combined pinion and brake mechanism constructed in accordance with the present invention.

Figure 2 is a view in sectional end elevation taken on the dotted line 2—2 of Figure 1, and, Figure 3 is a detail view of portion of the brake mechanism, portion being broken away for convenience of illustration.

Figure 4:
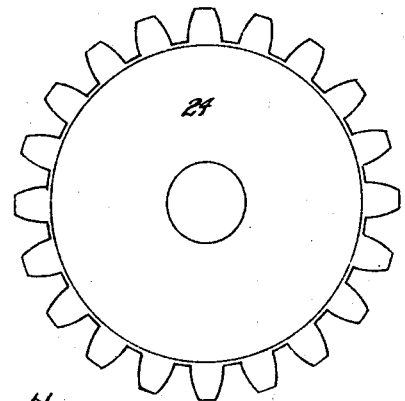
Figure 4 is a view in elevation of a toothed disc.

In these drawings where like characters of reference refer to the same or corresponding parts throughout the different views the numeral 17 designates a frame supporting a pair of transverse shafts 18 and 19 on the former of which is mounted a pinion 20 meshing with a spur wheel 21 associated with the winding drum 22 mounted on the shaft 19.

The shaft 18 is provided at one or both ends with a crank handle 23 or other means for imparting rotation thereto.

The pinion 20 consists of a series of alternatively arranged toothed discs 24 and friction discs 25 the former being free to rotate on the shaft and the latter being mounted non-rotatively thereon.

Figure 5:
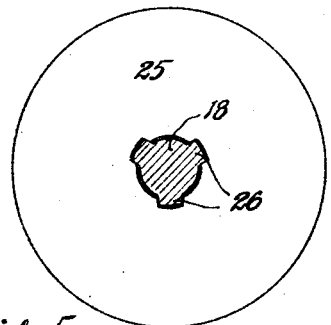
Figure 5 is a view in elevation of a friction disc or plate.

The portion of the shaft 18 engaged by the friction discs is formed with one or more splines or keyways 26 and the holes in the centres of the friction discs are shaped to conform with this portion of the shaft whereby they are free to move longitudinally, but, not rotate independently of the said shaft, see Figure 5.

The shaft 18 is provided with a fixed collar 27 and the assemblage of alternately arranged toothed discs and friction discs are arranged close to the same.

A collar 28 is movably mounted on the shaft 18 on the opposite side of the assemblage of toothed and friction discs to that on which the fixed collar 27 is situated and the said movable collar is adapted to be thrust against the adjacent disc by means of suitably arranged springs 29.

The springs 29 are mounted on rods 30 which connect the movable collar 28 to a second movable collar 31 on the shaft 18 at a little distance from the pinion. The outer ends of the springs 29 bear against a collar 32 fixed to the shaft 18 and between the ring or collar 32 and the movable collar 31 is mounted a distance sleeve 33. This sleeve 33 is adapted to maintain the collar 31 normally at a predetermined distance from the fixed collar 32.

A ring 34 surrounds the sleeve 33 and its outer end is provided with diametrically opposed recesses 35 in which are accommodated cam shaped studs 36 projecting inwardly from jaws 37 on a control lever 38. The lever is maintained at a convenient position for operation by means of a projection 39 on the ring 34 bearing against a tie rod 42 connecting the sides of the frame.

By moving the lever 38 laterally in either direction the corresponding angular displacement of the cam studs 36 will cause the ring 31 to be moved away from the fixed collar 32 and the collar 28 to be moved away from the adjacent friction disc.

When the collar 28 is moved away from the adjacent friction disc of the flexible pinion the toothed discs are more or less free to rotate on the shaft 18 independently of the friction discs should a load be supported on a rope wound on the winding drum and when the lever 38 is released the springs 29 will cause the collar 28 to be forced hard against the inner disc of the flexible pinion and the end pressure exerted by the springs on the said collar will cause the toothed discs to be firmly held between the friction discs.

Each toothed disc of the pinion is adapted to carry its proportion of the load by the frictional engagement with the friction discs and when any overloading is applied to any of the toothed discs it is enabled to automatically move angularly or rotarily to a slight extent and thereby adapt itself to any unevenness in the teeth of the spur wheel with which it engages.

The shaft 18 is provided with a fixed ratchet disc 40 the teeth of which are engaged by a pawl 41 pivotally supported on the tie rod 42 connecting the side plates of the frame 17.

The teeth on the ratchet wheel are formed with radial sides whereby the pawl will engage the same and prevent rotation of the shaft 18 in either direction according to the disposition of the pawl.

In operation the pawl is set whereby it will ratchet over the teeth of the ratchet wheel when the shaft 18 is rotating and will prevent any back lash or reverse movement of the shaft when the operating handles are released and a load is applied to a rope wound on the winding drum 22.

The load on the winding rope may be lowered gradually by imparting a slight angular movement to the control lever 38 to release the frictional engagement between the elements of the pinion and it may be lowered rapidly by moving the lever sufficiently to cause the ring 28 to be moved clear of the pinion.

During the lowering of the load the pawl and ratchet mechanism will hold the shaft and the friction discs against rotation and the toothed discs only will be free to rotate under the influence of the load.

When the load is lowered a required distance the lever is released and the frictional engagement between the disc elements of the pinion due to the pressure exerted by the springs 29 will hold the toothed discs against further rotation and cause the load to be held stationary. Thus by arranging the friction release mechanism and holding pawl as above described the pinion can be utilized as a friction clutch or brake for yieldingly holding the gearing in mesh with the pinion against rotation.

The friction discs preferably are formed with one flat side and with the opposite side having a slight taper or conical formation and the contiguous faces of the toothed discs are shaped to correspond therewith.

By constructing the friction discs and toothed discs as above described they will each have a maximum strength at the point where they are subjected to the greater strains that is to say, the portions of the frictions discs engaging the splines or keyways on or in the shaft 18 are thicker than the outer edges thereof and the portion of the toothed discs from which the teeth are shaped are thicker than the portion surrounding the hole in the centre thereof.

Figure 6:
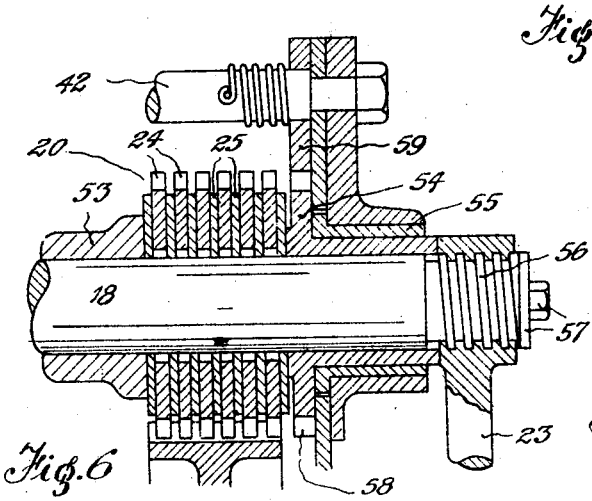
Figure 6 is a view in elevation illustrating another form of the invention.

In the form of the invention illustrated in Figure 6 a fixed collar 53 is mounted on the shaft on the inside of the pinion 20 and a collar 54 is mounted slidably and non-rotatively on the shaft on the outside of the said pinion.

The slidably mounted collar is provided with a sleeve 54' which extends through the bearing 55 for the shaft and the outer end of the said sleeve bears against the boss on the end of the crank handle 23. The outer end of the shaft 18 is provided with a worm 56 which is engaged by an internal thread in the boss on the crank handle 23 and a washer and set screw 57 are provided on the end of the shaft to prevent the handle being removed therefrom. The threaded engagement between the boss on the crank handle and the shaft is so arranged that when the handle is rotated in one direction the collar 54 is moved endwise on the shaft until the friction discs and toothed discs are pressed firmly together when the continued rotation of the handle will cause a wheel meshing with the pinion to be rotated. When it is desired to release a load, as from the winding drum, the crank handle is given a partial rotation in a reverse direction whereby the threaded boss on the handle will be moved outwardly on the shaft and permit a corresponding outward movement of the collar 54 to relieve the pressure or frictional engagement between the friction discs and toothed discs.

It will be readily understood that the crank handle may be moved in a reverse direction just sufficiently far to enable the frictional engagement between the friction discs and the toothed discs to release the load or permit the winding rope to pay off more or less slowly under the influence of the load and the frictional resistance between the said discs may be varied by an angular adjustment of the crank according to requirements.

The slidably mounted collar 54 may be provided with ratchet teeth 58 on its periphery which are adapted to be engaged by a spring actuated pawl 59 pivotally supported on the frame of the winch and this pawl and ratchet mechanism is for the purpose of retaining the shaft 18 and the driving gear in a fixed position when the operating handle is released.

The ratchet teeth on the collar 54 may be formed at an angle or on the skew and the engaging end of the pawl 59 may be correspondingly shaped whereby the pressure exerted between the engaging faces of these elements will facilitate the outward movement of the longitudinally slidable member 54' and the release of the frictional engagement between the friction discs and toothed discs when a partial rotation is given to the operating handle in the reverse direction.

Figure 7:
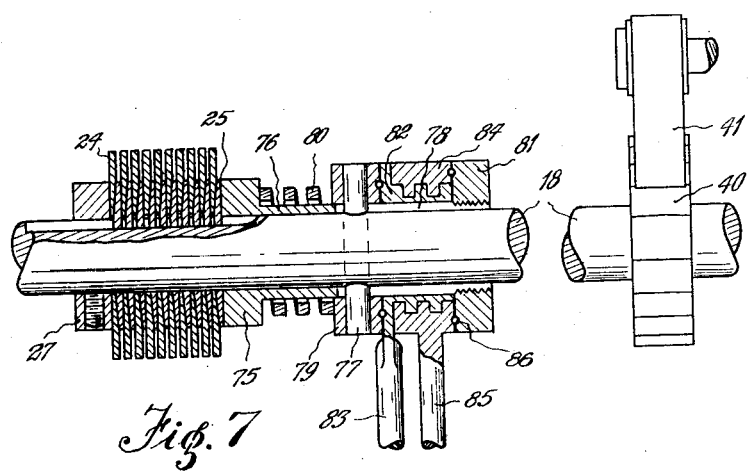
Figure 7 illustrates a modification of the invention and hereinafter will be fully described.

In the modification of the invention shown in Figure 7 of the drawings the elements of the flexible pinion are mounted on the shaft 18 between the fixed collar 27 and a collar 75 on a sliding sleeve 76.

The sleeve 76 is secured non-rotatively to the shaft by means of a pin 77 passing diametrically through the shaft 18, extended slots 78 formed in opposite sides of the sleeve and through a ring 79 surrounding the said sleeve.

A compression spring 80 is mounted on the sleeve between the collar 75 and the fixed ring 79 and this spring tends to force the collar on the sleeve against the adjacent end of the flexible pinion whereby the friction discs and toothed discs forming the same are forced into frictional engagement with each other.

The inner end of the sleeve 76 is provided with a nut 81 and between the ring 79 and nut 81 is mounted a sleeve 82 having a thread formed on the exterior thereof. The sleeve 82 is provided with a radially disposed lever 83.

A nut 84 is threaded on the sleeve and this nut is adapted to bear against the nut 81 on the end of the sleeve. The nut 84 is provided with a lever 85 projecting radially therefrom and in order to ensure the free operation of the nut and/or the sleeve antifrictional bearings 86 are disposed between the nuts 81 and 84 and between the sleeve 82 and ring 79.

The lever on the sleeve 82 may be secured to the frame of the machine whereby the sleeve will be prevented from rotating when the nut 84 is adjusted by angularly displacing the lever 85 to cause the sleeve 76 to be moved longitudinally on the shaft 18 to release the frictional engagement between the elements of the flexible pinion.

If preferred both lever 83 and 85 may be left free and operated in reverse directions when it is desired to move the sleeve 76 endwise on the shaft to release the pressure on the discs or to apply pressure thereto or to allow pressure to be applied thereto by the spring 80.

The shaft 18 is provided with ratchet and pawl mechanism 40 and 41 as and for the purposes hereinbefore described.

Figure 8:
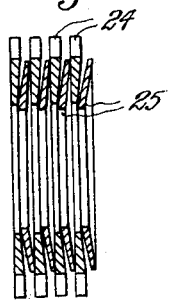
Figures 8 and 9 are views in sectional elevation of part of a modified form of flexible pinion which hereinafter will be fully described.
Figure 9:
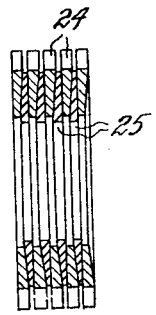

In lieu of making the friction discs as hereinbefore described they may be made of resilient material and be given a dished formation as illustrated in an exaggerated form in Figure 8 of the drawings, whereby they will have a tendency to open out and move the toothed discs apart when the clamping pressure of a spring or cam member is released and may be compressed to align correctly with the toothed discs when the clamping pressure is applied, as illustrated in Figure 7 of the drawings.

Flexible friction discs as above described will when released more readily break down the film of oil between the faces of the friction discs and toothed discs and release the latter than when made in a rigid form as illustrated in Figures 2 and 4 of the drawings.

It will be readily understood that in each example of the invention described and illustrated that all the toothed discs are free to rotate within limits and at the same time to move longitudinally upon the shaft thereby providing sufficient flexibility of the wheel to accommodate itself to any variation in the alignment of one or other of the shafts supporting the intermeshing gear wheels and enabling the teeth of both wheels to mesh correctly at all times.

In some cases as in a double purchase crane or crab winch the driving shaft provided with the flexible pinion can be moved endwise to move the pinion from engagement with one spur wheel into mesh with a second spur wheel for the purpose of varying the leverage applied to the winding drum.

Whilst I have described in the foregoing specification certain practical applications of the invention, it will be readily understood that various alterations, modifications and re-arrangements of the parts may be effected to adapt the invention to different machines without departing from the spirit and scope of the same and I therefore do not wish to be understood as confining myself by the precise terms employed in the description excepting such as the state of the art may require.

I claim:

1. In flexible gear wheel mechanism, a flexible gear wheel comprising an assemblage of alternately arranged toothed and friction discs, the said toothed discs being rotatively and slidably mounted on a rotary driving member and the friction discs being non-rotatively but slidably mounted on the said member, means for applying a yielding end pressure to the assemblage of discs, pawl and ratchet mechanism for locking the rotatively mounted members against rotation in one of two directions, and means for varying the yielding end pressure on the assemblage of discs whereby the flexible gear wheel will act as a brake to control the rotation of a gear wheel in mesh therewith, said means comprising an operating instrumentality mounted on said rotary driving member clamping members at either end of said assemblage, and means for releasing one of said clamping members from engagement with said assemblage.

2. In flexible gear wheel mechanism, a flexible gear wheel comprising an assemblage of alternately arranged toothed and friction discs, the said toothed discs being rotatively and slidably mounted on a rotary driving member and the friction discs being non-rotatively but slidably mounted on the said member, means for applying a yielding end pressure to the assemblage of discs, pawl and ratchet mechanism for locking the rotatively mounted members against rotation in one of two directions, means for varying the yielding end pressure on the assemblage of discs whereby the flexible gear wheel will act as a brake to control the rotation of a gear wheel in mesh therewith, said means comprising an operating instrumentality mounted on said rotary driving member, clamping members at either end of said assemblage, one said member being fixedly mounted and the other being spring-mounted, on said driving member, and means for retracting said spring-mounted member.

3. In flexible gear wheel mechanism, a flexible gear wheel comprising an assemblage of alternately arranged toothed and friction discs, the said toothed discs being rotatively and slidably mounted on a rotary driving member and the friction discs being non-rotatively but slidably mounted on the said member, means for applying a yielding end pressure to the assemblage of discs, pawl and ratchet mechanism for locking the rotatively mounted members against rotation in one of two directions, means for varying the yielding end pressure on the assemblage of discs whereby the flexible gear wheel will act as a brake to control the rotation of a gear wheel in mesh therewith, said means comprising an operating instrumentality mounted on said rotary driving member, clamping members at either end of said assemblage, one said member being fixedly mounted and the other being spring-mounted, on said driving member, means for retracting said spring-mounted member, said means comprising rods attached to the inner of the two clamping members, springs on said rods, a fixed collar in which are anchored the distal end of said rods, a slidable collar spaced from said fixed collar by a distance-ring, a rotatable cam on said operating instrumentality, engaging in a cam-slot in said distance-ring, whereby when the operating instrumentality is rotated parallel to the rods, the inner clamping plate is released.

4. In a flexible gear wheel mechanism, a flexible gear wheel comprising an assemblage of alternately arranged toothed and friction discs mounted on a rotary driving member, means for applying end pressure to the assemblage of discs, pawl and ratchet mechanism for permitting the driving member to rotate in one direction and prevent it rotating in the reverse direction, a lever freely mounted on the shaft between the flexible pinion and pawl and ratchet mechanism, and means controlled by the operation of the lever for varying the end pressure on the assemblage of discs to permit the flexible gear wheel to act as a friction brake to control the rotation of a gear wheel in mesh therewith.

5. In flexible gear wheel mechanism, a flexible gear wheel comprising an assemblage of alternately arranged toothed and friction discs, the said toothed discs being rotatively and slidably mounted on a rotary driving member and the friction discs being non-rotatively and slidably mounted on the said member, pawl and ratchet mechanism for locking the rotatively mounted member against rotation in one direction, a fixed element and a longitudinally movable element on the rotary driving member, means associated with the fixed and movable elements for applying an end pressure to the assemblage of discs, and lever controlled means interposed between the fixed and movable elements for regulating the end pressure on the assemblage of discs whereby the flexible gear wheel will act as a brake to control the rotation of a gear wheel in mesh therewith.

6. In flexible gear wheel mechanism, a flexible gear wheel comprising an assemblage of alternately arranged toothed and friction discs on a rotatively mounted shaft, the said toothed discs being rotatively and slidably mounted on the shaft and the friction discs being non-rotatively and slidably mounted on the said shaft, pawl and ratchet mechanism for locking the shaft against rotation in one direction, a fixed collar on the shaft at one end of the discs, a collar slidably mounted on the shaft at the opposite end of the disc, a fixed collar on the shaft adjacent to the slidably mounted collar, a movable collar on the opposite side of the second mentioned fixed collar, bolts connecting the movable collars and passing through holes in the second mentioned fixed collar, a distance ring interposed between the second mentioned fixed collar and movable collar, compression springs mounted on the bolts between the second mentioned fixed collar and the movable collar bearing against the assemblage of discs, a ring surrounding the distance ring and having diametrically opposed slots therein, a forked lever embracing the outer ring and having inwardly projecting cam members on the jaws thereof engaged by the slots, whereby the displacement of the cam members will cause the end pressure on the discs to be varied so that the flexible gear wheel may serve as a friction brake.

7. In flexible gear wheel mechanism, a series of toothed discs rotatively mounted on a shaft, a series of intermediately disposed friction discs of smaller diameter mounted slidably and non-rotatively on the shaft, a ratchet and pawl device for locking the shaft against rotation in one direction, a collar fitted rigidly to the shaft on one side of the assemblage of discs, a sleeve mounted slidably and non-rotatively on the shaft on the opposite side of the assemblage of discs, a ring surrounding the sleeve and keyed to the shaft, a collar on the end of the sleeve bearing against the assemblage of discs, a compression spring interposed between the ring keyed to the shaft and the collar on the end of the sleeve, a nut fitted to the outer end of the sleeve, a ring interposed between the fixed ring and the nut on the end of the sleeve and having a thread disposed on the exterior thereof, a ring having an internal thread engaging the thread on the exterior of the first mentioned ring and levers on the concentrically arranged rings for effecting an angular displacement of the same whereby the pressure exerted by the spring on the assemblage of discs may be varied as desired.

8. In flexible gear wheel mechanism, a flexible gear wheel comprising a series of toothed discs rotatively mounted on a shaft, a series of intermediately disposed friction discs of smaller diameter mounted slidably and non-rotatively on the shaft, a fixed member on the shaft on one side of the assemblage of discs, a collar slidably mounted on the shaft on the opposite side of the assemblage of discs, a spring adapted to thrust the slidable collar yieldingly against the assemblage of discs, means for locking the shaft against rotation in one direction, and a lever for adjusting the position of the slidable collar to vary the pressure exerted by the said spring whereby the flexible gear wheel may serve as a brake.

9. In flexible gear wheel mechanism, a series of toothed discs rotatively mounted on a shaft, a series of intermediately disposed friction discs of smaller diameter mounted slidably and non-rotatively on the shaft, pawl and ratchet mechanism for locking the shaft against rotation in one direction, a fixed collar on the shaft on one side of the assemblage of discs, a collar slidably mounted on the shaft on the opposite side of the assemblage of discs, a fixed element located on the shaft adjacent to the slidably mounted collar, springs arranged between the fixed element and the slidably mounted collar, and lever controlled means for adjusting the position of the slidably mounted collar to relieve the pressure on the assemblage of discs and thereby permit the flexible gear wheel to act as a brake.

10. In flexible gear wheel mechanism according to claim 4, inwardly bevelled faces on one side of the toothed discs and flat faces on the opposite sides thereof, and friction discs of resilient material having a dished formation and adapted under the influence of end pressure to bear closely against the bevelled and flat sides of the toothed discs, substantially as described.

In witness whereof I hereunto affix my signature.

ALFRED ARTHUR QUICK.